US008830033B1

(12) United States Patent
Duxbury et al.

(10) Patent No.: US 8,830,033 B1
(45) Date of Patent: Sep. 9, 2014

(54) ACTIVE EMI SHIELDING FOR PROTECTION OF MEDICAL INSTRUMENTS

(75) Inventors: Guy Michael Anyon Farguharson Duxbury, Nepean (CA); Alan Graves, Kanata (CA); Brian Johnson, Kensington, MD (US); Jeffrey Fitchett, Kanata (CA); Peter Ashwood Smith, Genevriers Hull (CA)

(73) Assignee: Avaya Inc., Basking Ridge, NJ (US)

( * ) Notice: Subject to any disclaimer, the term of this patent is extended or adjusted under 35 U.S.C. 154(b) by 679 days.

(21) Appl. No.: 11/197,291

(22) Filed: Aug. 4, 2005

Related U.S. Application Data

(60) Provisional application No. 60/598,808, filed on Aug. 4, 2004.

(51) Int. Cl.
*G08B 5/22* (2006.01)
*H04Q 1/30* (2006.01)

(52) U.S. Cl.
USPC ...... 340/7.36; 340/7.61; 455/456.4; 361/816; 361/818

(58) Field of Classification Search
CPC ...... G08B 5/224; G08B 3/1025; G08B 5/225; G08B 5/229; G08B 3/1066; E21F 17/18; H04W 88/022; H04W 52/02; H04W 52/0216; H04B 1/40
USPC ............. 361/816, 818; 455/67.11, 456.4; 340/635, 10.34, 7.32, 7.33, 7.35, 7.36, 340/7.58, 7.61
See application file for complete search history.

(56) References Cited

U.S. PATENT DOCUMENTS

| | | | | |
|---|---|---|---|---|
| 6,014,022 A | * | 1/2000 | Demma et al. | 324/207.12 |
| 6,034,603 A | * | 3/2000 | Steeves | 340/10.2 |
| 6,496,703 B1 | * | 12/2002 | da Silva | 455/456.4 |
| 6,782,266 B2 | * | 8/2004 | Baer et al. | 455/456.4 |
| 2002/0188259 A1 | * | 12/2002 | Hickle et al. | 604/189 |
| 2003/0045269 A1 | * | 3/2003 | Himmel et al. | 455/408 |
| 2003/0224803 A1 | * | 12/2003 | Konno | 455/456.1 |
| 2006/0232437 A1 | * | 10/2006 | Gutowski et al. | 340/825.69 |
| 2006/0287004 A1 | * | 12/2006 | Fuqua | 455/558 |

* cited by examiner

*Primary Examiner* — Brian A. Zimmerman
*Assistant Examiner* — Omer S Khan
(74) *Attorney, Agent, or Firm* — Anderson Gorecki & Rouille LLP

(57) ABSTRACT

An active EMI shield for protecting medical instruments from mobile RF emitters uses RFID tags and tag readers to facilitate identification of an RF emitter entering the EMI shield. Clinicians and mobile RF emitters are tagged with RFIDs that indicate their identity, and possibly RF power level. Medical instruments are either tagged with RFIDs that indicate their identity and susceptibility to EMI, or equipped with RFID readers/EMI sensors. The proximity of the RF emitter relative to the medical instrument in terms of power density can then be determined by either position-sensitive RFID readers or the EMI sensors affixed to the medical instruments. The shield is executed by signaling to the tagged RF emitter when it reaches a predetermined proximity relative to the medical instrument.

12 Claims, 3 Drawing Sheets

ACTIVE EMI SHIELDING FOR PROTECTION OF MEDICAL INSTRUMENTS

CROSS-REFERENCE TO RELATED APPLICATIONS

A claim of priority is made to U.S. Provisional Patent Application Ser. No. 60/598,808, entitled ACTIVE EMI INTERFERENCE SHIELDING: EMI PROTECTION OF MEDICAL INSTRUMENTS USING AN INTELLIGENT SENSOR NETWORK, filed Aug. 4, 2004.

FIELD OF THE INVENTION

This invention relates generally to the field of electronics, and more particularly to protection of critical devices such as medical instruments against EMI.

BACKGROUND OF THE INVENTION

The risk of malfunctions in medical equipment due to electromagnetic interference ("EMI") from mobile RF sources has been a long-standing problem. One problematic RF energy source is mobile phones that may be carried by hospital workers, patients and visitors and which are used more pervasively throughout hospitals as time progresses. Another problematic RF energy source is mobile data devices. Hospitals have begun to embrace wireless networking technology such as IEEE 802.11 WLANs to increase productivity, including clinical productivity, requiring the use of wireless equipment in proximity to clinical equipment. For example, some health care workers now use wireless-connected PDAs and laptops to retrieve, review, enter, display and coordinate data regarding patients. Such data might include images such as x-rays, MRIs and CT scans, in addition to medication schedules, and medical history. Within buildings it is possible that mobile phones will soon be using WLANs for communication. Hence, it is not practical to simply prohibit the problematic devices from the hospital.

Passive shielding against electromagnetic interference ("EMI") has been used in the field of electronics for a considerable time. A signal line, component, or circuit board that will be subjected to unacceptable levels of EMI is shielded by partially or completely surrounding it with a grounded conductor. Such passive shielding is typically used to protect against EMI from within a device, or from adjacent devices. However, much of the medical equipment currently in use was not designed to shield against close proximity with WLAN devices and mobile phones. Further, retrofitting medical equipment with passive shielding would be costly and time-consuming.

SUMMARY OF THE INVENTION

In accordance with the invention an active shield is employed to protect against EMI. Apparatus operable to protect a device against EMI via an active shield includes: logic operable to determine proximity of a mobile emitter of RF energy relative to the device in terms of RF energy; logic operable to identify the mobile emitter from a radio frequency identification ("RFID") tag associated with the mobile emitter; and logic operable to prompt reduction of RF energy emitted by the mobile emitter at a predetermined proximity relative to the device in terms of RF energy. In one embodiment the logic operable to identify the mobile emitter includes a mobile RFID reader disposed proximate to the protected device. A method for protecting a device against EMI via an active shield includes the steps of: determining proximity of a mobile emitter of RF energy relative to the device in terms of RF energy; identifying the mobile emitter from a RFID tag associated with the mobile emitter; and prompting reduction of RF energy emitted by the mobile emitter at a predetermined proximity relative to the device in terms of RF energy.

Advantages of the invention include low cost, simple retrofit of exiting medical instruments and in at least some embodiments auto-configuration. The invention can be implemented at relatively low cost because it can utilize inexpensive WLAN and RFID infrastructure. Since RFID tags and readers are relatively small, lightweight and unobtrusive, it is relatively simple to retrofit a medical instrument by affixing an RFID tag or reader thereto, in comparison with retrofitting the instrument with passive shielding. In the case of a passive RFID tag it may not even be necessary to provide power as part of the retrofit process. Finally, the invention is at least partially auto-configuring when RFID readers are affixed to the medical instruments, and also when position-sensitive RFID readers are used to detect RFID tags affixed to the medical instruments. In other words, the medical instruments can be moved about within the hospital without manually updating a database. Other advantages will be apparent to those skilled in the art in view of the following detailed description.

DETAILED DESCRIPTION

Figure 1:
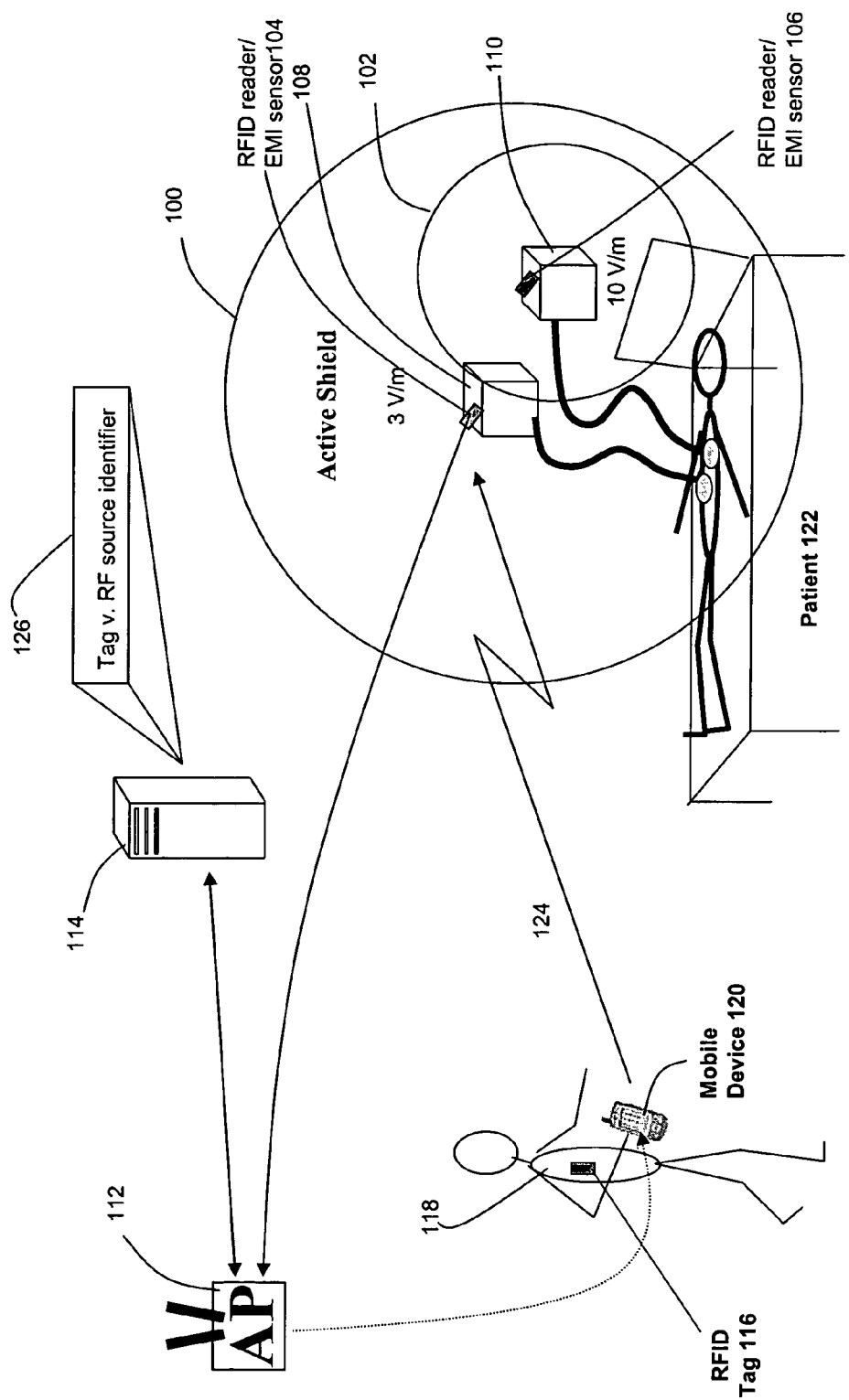
FIG. 1 illustrates active EMI shielding with RFID reader/EMI sensors on each susceptible device.

FIG. 1 illustrates active EMI shields (100, 102), each having a boundary defined by a selected RF power level threshold. For example, the boundary of active shield (100) may be set relative to 3 V/m and the boundary of active shield (102) may be set relative to 10 V/m in accordance with the IEC 60601 standard. The EMI shields actively reduce EMI by sensing the approach of an RF interferer and prompting reduction of the transmission power of the interferer. In the illustrated embodiment the active EMI shields include an RFID reader/EMI sensor (104, 106) affixed to each susceptible medical instrument (108, 110), at least one wireless access point ("AP") (112), a server (114), and an RFID tag (116) associated with a person such as a clinician (118) or mobile wireless device (120). The EMI sensor is in effect a calibrated sensitivity broadband radio receiver, or a receiver responsive to the frequencies to be protected against. In the case of cellular and WLAN protection this requires receivers sensitive to frequencies around 900 MHz, 2.4 GHz and 5.4 GHz. This can be achieved by either a broad 900– MHz to 5.5+ GHz receiver or by use of three receivers, one for each band.

Operation of the illustrated embodiment will now be described by way of example. As the clinician (118) with the mobile wireless device (120) approaches a patient (122), the RFID reader/EMI sensors (104, 106) affixed to the medical instrumentation (108, 110) detect the RF energy (124) emitted by the mobile device (120). Each RFID reader/EMI sensor is operable to obtain the information associated with the RFID tag (116). In the case of a passive tag the RFID reader provides a directional excitation signal beamed away from the medical instrument to be protected to avoid interfering with it, which prompts a response from the tag. In the case of an active tag the signal may be unilaterally broadcast by the tag. In either case, the tag (116) includes information which is employed to identify the approaching RF source, e.g., the mobile device, the clinician, or both. When the RF energy (124) reaches the predetermined threshold defined by the active shield (100) boundary then the RFID reader/EMI sensor (104) prompts a reduction in the level of RF energy emitted by the mobile device. In particular, the RFID reader/EMI sensor sends a message to the server (114) via the AP (112), or via a wired connection (not illustrated), indicating that the RF source associated with the RFID tag information is approaching the medical instrumentation (108) at an unacceptably high RF power level. The server (114) employs the tag information to index into a table (126) to obtain an RF source identifier, such as an Instant Message or Alert (IM) address, IP address, or MAC address. The server then sends a signal to prompt reduction of the RF power level of the mobile unit. The need for the server might be obviated if the RFID tag information includes the RF source identifier.

Reduction of the RF power level of the mobile unit is prompted in one embodiment by sending an IM or Alert from the server (114) to the clinician (118). In this case the clinician would be expected to respond to the message by turning the mobile device (120) OFF or temporarily placing the mobile device at a safe range relative to the medical instrumentation (108). Other types of visible and audible alarms could also be used to prompt action by the clinician. For example, an alarm proximate to the medical instrumentation or worn by the clinician could be triggered. Because manual action is ultimately required to reduce the RF power output of the mobile device, the RF output of the device may be manually increased by the clinician when the mobile device is moved outside of the boundary.

Reduction of the RF power level of the mobile device is prompted in another embodiment by sending a signal from the server (114) to the mobile device (120) that causes the mobile device to reduce power or turn itself OFF. In particular, the mobile device is automatically operable in response to the signal to reduce RF power such that no manual intervention by the clinician is required. The RF power output of the mobile device may be automatically increased in response to signaling from the server when the mobile unit is calculated to be outside the boundary of the active shield (100). Alternatively, the mobile device may be configured to periodically attempt gradual increases in power output, which will be successful when the mobile unit is outside the boundary and which will prompt another signal from the RFID reader/EMI sensor and server when the mobile unit is still within the boundary.

Figure 2:
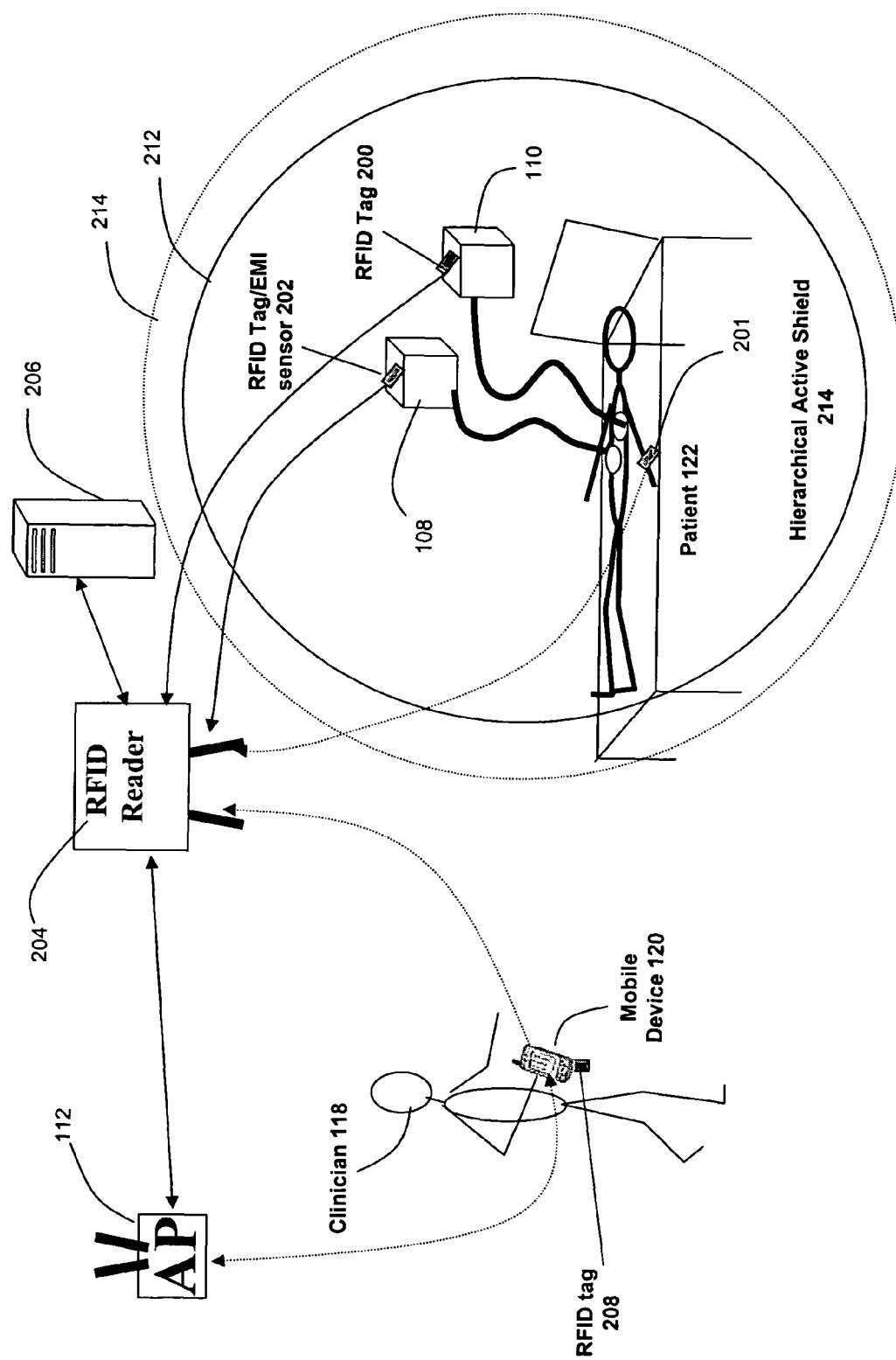
FIG. 2 illustrates active EMI shielding with RFID tags/EMI sensors on each susceptible device.

Referring now to FIG. 2, in an alternative embodiment a server (206) calculates the relative positions of the wireless device (120) relative to the medical instrumentation (108, 110). This embodiment includes an RFID tag (200, 201) or RFID tag/EMI sensor (202) affixed to each susceptible medical instrument (108, 110), one or more position-sensitive RFID readers (204), a server (206), at least one wireless access point ("AP") (112), and an RFID tag (208) associated with the clinician (118) or mobile wireless device (120). Each RFID tag/EMI sensor (202) includes information indicative of the particular medical instrument (108) to which it is affixed. Similarly, each RFID tag (208) affixed to or associated with a clinician or mobile device includes information indicative of the particular clinician or mobile device. The server (206) implements the active shield (210) by calculating the boundaries of the shield and monitoring the relative positions of the tagged RF sources and medical instrumentation.

In order to calculate the boundaries of the shield the server obtains information associated with the RFID tags (200, 202) via the position-sensitive RFID reader or array of readers (204). A position-sensitive array of receivers might take the form of an Ultra-Wideband location system since such systems are known to provide sufficient accuracy. The information in each RFID tag and RFID tag/EMI sensor that is affixed to a medical instruments includes an indication of the level of EMI to which the medical instrument can be safely subjected. Based on the positions of the RFID tags and the indicated safe levels of EMI the server calculates the location and boundaries of a three-dimensional sphere centered around the RFID tag corresponding to the safe level of EMI, i.e., the active shield (210). A single boundary for each medical instrument can be employed, as already described above. Alternatively, hierarchical boundaries (212, 214) can be established, e.g., corresponding to a "caution" zone and a "danger" zone, such that increasingly aggressive remedial actions can be prompted if the mobile RF source approaches the medical instrument without reducing RF power to an acceptable level. Individual active shields may be provided for each medical instrument as already described above, or the collection of medical instruments associated with the patient may be combined by the server to calculate a single shield (210) having one or more boundaries.

Operation of the illustrated embodiment will now be described by way of example. As the clinician (118) with the tagged mobile device (120) approaches the patient (122), the position-sensitive RFID reader (204) detects the position of the tagged mobile device relative to the active shield (210). If the RFID tag (208) associated with the mobile device includes an indication of the RF power level emitted by the mobile device (either maximum or current RF power level) then the server (206) calculates the minimum acceptable distance of the mobile device with respect to the center of the active shield, i.e., the boundaries (212, 214), and prompts remedial action before the medical instruments are subjected to unacceptable levels of EMI from the mobile device. Potential remedial actions have already been described above.

If the RFID tag (208) associated with the mobile device does not include an indication of the RF power level emitted by the mobile device then the EMI sensor portion of the RFID tag/EMI sensor (202) is employed to calculate the position of the boundaries (212, 214) relative to the mobile device. In particular, the RFID tag/EMI sensor provides a power level measurement to the server which is employed by the server to calculate the position of the boundaries. As described above, the RFID tag affixed to the mobile unit includes information which can be employed to identify the approaching RF source. When the mobile device reaches the outer shield boundary (214), then the server prompts a reduction in the level of RF energy emitted by the mobile device by sending a message to the mobile device indicating that the RF source associated with the RFID tag information is approaching the medical instrumentation at an unacceptably high RF power level. For example, the server may employ an RF source identifier, such as an IM address, IP address, or MAC address to direct a signal or message to prompt reduction of the RF power level of the mobile unit. The need for the server might be obviated if the RFID tag information includes the RF source identifier.

Referring again to FIG. 1, in certain circumstances when multiple mobile devices are approaching the shield it may not be practical to calculate which of those mobile devices is of greatest concern. Consequently, the server (114) may be operable to take action to reduce the RF power level of some or all mobile devices within a predetermined range of the shield in order to assure that the mobile device posing the greatest current danger is subjected to remedial action. For example, all mobile devices detected by the RFID reader/EMI sensor (104) may be alerted to reduce power. Hence, the remedial action is localized to the sensor associated with the shield being approached.

Figure 3:
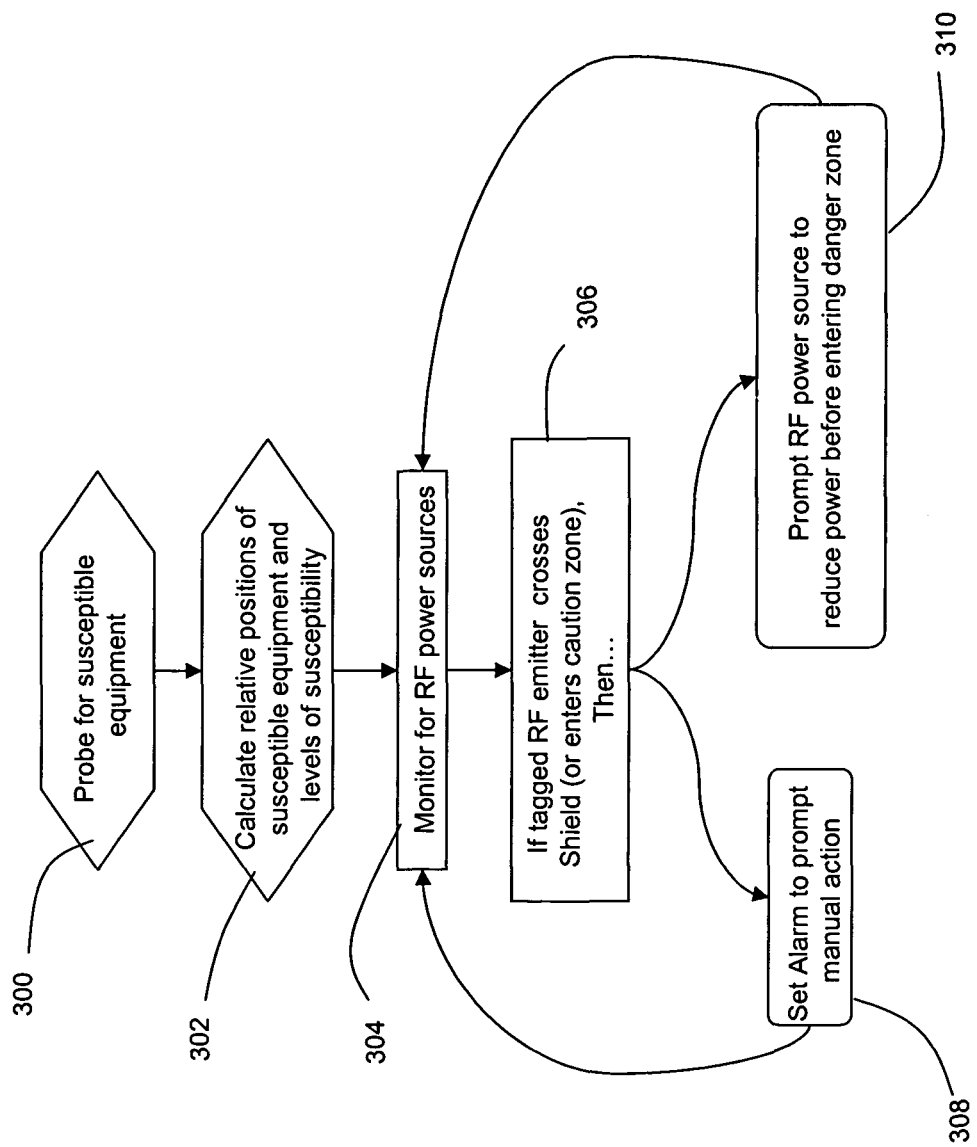
FIG. 3 illustrates a method for implementing active EMI shielding.

FIG. 3 illustrates a method for implementing an active shield. In a first configuration step (300) the area is probed for susceptible equipment. Subsequently, the relative positions and levels of susceptibility of the susceptible equipment are calculated as indicated by step (302). It will be appreciated that the server might be pre-loaded with such configuration information. However, since some medical instruments are wheeled from room to room or otherwise repositioned it may be preferable to probe for susceptible equipment and recalculate when equipment has been moved. It will also be appreciated that in certain implementations the configuration steps (300, 302) may be unnecessary.

In a first operation step (304) the area is monitored for RF emitters. As already discussed above, the monitoring may be executed by various different devices including but not limited to the position-sensitive RFID reader, RFID reader/EMI sensor and RFID tag/EMI sensor. If a tagged RF emitter crosses the shield boundary, or enters the outer caution zone of a hierarchical shield depending on the implementation, as indicated by step (306), then an alarm is set to prompt manual action to reduce RF power as indicated by step (308). If possible, the RF emitter is capable of responding to signaling to reduce RF power then that action is taken as indicated in step (310).

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A system which protects a protected device from a mobile device which emits radio frequency energy, the system comprising:
  a radio frequency identification tag which is affixed to a person before the person enters a predefined area with the mobile emitter device, the radio frequency identification tag configured with data which uniquely identifies a the mobile emitter device; and
  a radio frequency identification reader associated with a the protected device, the radio frequency identification reader being associated with first logic which measures electrical proximity, in terms of incident power by direct measurement of radio frequency energy, of the mobile emitter device relative to the protected device, the radio frequency identification reader further being associated with second logic which identifies the mobile emitter from the data with which the radio frequency identification tag is configured, and third logic which prompts the person to reduce the radio frequency energy emitted by the mobile emitter device once the mobile emitter device is measured to be within a predetermined proximity relative to the protected device;
  wherein the radio frequency identification reader is disposed at a fixed position which is distant from the protected device;
  wherein the radio frequency identification reader is position-sensitive, and including fourth logic which determines the radio frequency energy level emitted by the mobile emitter device and the relative position of the mobile emitter device with respect to the protected device from the radio frequency identification tag associated with the mobile emitter device and a radio frequency identification tag associated with the protected device.

2. The system of claim 1, wherein the radio frequency identification reader is disposed proximate to the protected device.

3. The system of claim 2, in which the first logic, which measures proximity of the mobile emitter device relative to the protected device, further includes an electromagnetic interference sensor disposed proximate to the protected device.

4. The system of claim 3, in which the third logic, in response to signaling from the electromagnetic interference sensor and radio frequency identification reader, prompts manual reduction of radio frequency energy emitted by the mobile emitter device by communicating with an operator of the mobile emitter device.

5. The system of claim 1, wherein the radio frequency identification tag includes an address at which the mobile emitter device is reachable via network communications.

6. The system of claim 1, in which the first logic, which measures proximity of the mobile emitter device relative to the protected device, further includes a mobile electromagnetic interference sensor disposed proximate to the protected device.

7. A method comprising the steps of:
  configuring a radio frequency identification tag with data which uniquely identifies a mobile emitter device;
  affixing the radio frequency identification tag to a person before the person enters a predefined area with the mobile emitter device;
  determining electrical proximity of the mobile emitter device relative to a protected device in terms of incident power by direct measurement of radio frequency energy from the mobile emitter device on the protected device;
  identifying the mobile emitter device by reading the data with a radio frequency identification reader associated with the protected device; and
  prompting the person to reduce the radio frequency energy emitted by the mobile emitter device once the mobile emitter device is measured to be within a predetermined proximity relative to the protected device;
  employing a radio frequency identification reader disposed at a fixed position which is distant from the protected device to identify the mobile emitter device;
  employing a position-sensitive radio frequency identification reader and logic to identify the radio frequency energy level emitted by the mobile emitter device as indicated by the radio frequency identification tag associated with the mobile emitter device, and the relative position of the mobile emitter device with respect to the protected device from the radio frequency identification tag associated with the mobile emitter device and a radio frequency identification tag associated with the protected device.

8. The method of claim 7, including the further step of employing the radio frequency identification reader disposed proximate to the protected device to identify the mobile emitter device.

9. The method of claim 8, including the further step of employing an electromagnetic interference sensor disposed proximate to the protected device to determine electrical proximity of the mobile emitter device.

10. The method of claim 9, including the further step of prompting, in response to signaling from the electromagnetic interference sensor and radio frequency identification reader, manual reduction of radio frequency energy emitted by the mobile emitter device by communicating with an operator of the mobile emitter device.

11. The method of claim 7, including the further step of employing the radio frequency identification tag associated with the mobile emitter device and the reader to read the data to determine an address at which the mobile emitter is reachable via network communications in order to prompt reduction of radio frequency energy emitted by the mobile emitter device at a predetermined proximity relative to the protected device.

12. The method of claim 7, including the further step of employing a mobile electromagnetic interference sensor disposed proximate to the protected device to determine proximity of the mobile emitter device.

\* \* \* \* \*

UNITED STATES PATENT AND TRADEMARK OFFICE
CERTIFICATE OF CORRECTION

| | | |
|---|---|---|
| PATENT NO. | : 8,830,033 B1 | Page 1 of 1 |
| APPLICATION NO. | : 11/197291 | |
| DATED | : September 9, 2014 | |
| INVENTOR(S) | : Duxbury et al. | |

It is certified that error appears in the above-identified patent and that said Letters Patent is hereby corrected as shown below:

In the Claims

At column 5, line 53, "a the" should read --a--.

At column 5, lines 54-55, "a the" should read --a--.

Signed and Sealed this
Third Day of February, 2015

Michelle K. Lee
*Deputy Director of the United States Patent and Trademark Office*